Patented Apr. 15, 1924.

UNITED STATES PATENT OFFICE.

RUBEN ZERTUCHE, OF WASHINGTON, DISTRICT OF COLUMBIA, ASSIGNOR TO SECRETARY OF WAR OF THE UNITED STATES OF AMERICA.

TREATMENT OF RUBBER.

No Drawing.   Application filed April 15, 1922. Serial No. 553,203.

(FILED UNDER THE ACT OF MARCH 3, 1883, 22 STAT. L., 625.)

*To all whom it may concern:*

Be it known that I, RUBEN ZERTUCHE, a citizen of Mexico, employed at Washington, D. C., have invented an Improvement in the Treatment of Rubber, of which the following is a specification.

The invention described herein may be used by the Government, or any of its officers or employees in prosecution of work for the Government, or by any other person in the United States, without payment of any royalty thereon.

This invention relates to a process for improving and preserving the elasticity of rubber for a period of from ten to twenty years.

This process may be applied to the rubber in its crude state, immediately after it has been worked or manufactured into commercial form, or up to a time at which the rubber has reached a state of hopeless decay and has hardened throughout the greater part of its thickness.

In treating old rubber the outer hardened portion of same must be removed and a reasonably elastic portion of the rubber reached, to properly apply this improving and preserving process, which is not effective after the rubber has crystallized. The rubber must therefore still possess a part, at least, of its elasticity, otherwise the same cannot be improved or preserved.

The objects are to provide a treatment for the preservation of the elasticity of rubber, either in its commercial or crude form, that is not only effective, but is simple and inexpensive; one that will provide a lasting, preserving effect, and be applicable to any form of rubber now on the market.

A further object is to provide a process that requires little or no special mechanism or paraphernalia in its application to the rubber, and that when once applied, will preserve an improved elasticity from ten to twenty years, depending on the intensity of, or extent of the treatment.

A further object being to leave the rubber in such a state that the changes of temperature will not affect it, and the atmospheric conditions will assist in its preservation, the moisture in the air acting as the preserving agent.

In describing this invention it may be well to state that the loss of elasticity in rubber is due to two principal causes:

First, the excess of sulphur that is not properly taken up by the rubber in mixing and remains in its original state in pockets or cavities throughout the rubber; said excess sulphur has a drying effect on the rubber and aids in the formation of a hardened, glazed or polished face on the surface of the rubber when pressure is applied in vulcanization.

Second, the forced or strained state of the molecules of the rubber brought about by its passage through the rollers or when otherwise pressed, in the curing or vulcanizing process.

These two conditions are the principal causes of deterioration of the ordinary commercial and crude rubber at present on the market.

By an examination of the rubber at present marketed, it will be noted that a glaze or finish is provided on the surface, supposedly to enhance its appearance, but primarily to exclude the atmosphere, said glazing closes the pores of the surface of the rubber.

It was in view of the knowledge of the above facts relative to the deterioration of rubber, that the present method of enhancing and preserving its elasticity was discovered.

The present process provides for first destroying the above mentioned glazed surface of the rubber, if it exists, then rendering at least the surface of the rubber porous, and at the same time relieving the strained set of the molecules of the rubber brought about by rolling or other mixing means, and permitting the molecules of the rubber to assume their natural state of rest.

To more fully explain the above mentioned state of strained condition of the molecules of the rubber that is relieved by this process, it may be stated that said condition exists to a greater degree in commercial than in crude rubber, since it is during the mixing of any of the many fillers and the sulphur into the crude or pure rubber that the molecules of the rubber are distorted and remain in that condition when the article is finished and placed on the market.

Sulphur is mixed with the rubber to prevent any effect thereon by the changes of temperature; it being the practice to add more sulphur in proportion as the temperature in which the rubber is to be used, increases. Said mixing is a setting or stiffening process, and when pressure in any one of many ways is applied in vulcanizing and the mass is pressed into different forms and remains or sets in its distorted position, the molecules are held in a state of tension and are therefore much more easily damaged, and wear away far more rapidly through their parting or separation under tension, than they would if they were in a relaxed or normal state of rest.

In some instances the rubber may be relieved of the outer glaze or surface finish by simply briskly rubbing with a brush or sand paper, or by a sand blast, which is very often the treatment when the article to be treated is thin.

If, however, the body to be treated is thick and the finish is also very heavy, or the hardening process, due to age, extends well below the surface, such as in old automobile tires, the surface may be first partially softened by immersion in a hot bath, preferably of water at about 100° F. for possibly as long as three or four days, but ordinarily said preliminary surface softening bath need not last over a few minutes, and must be governed by the condition of the mass to be treated.

In other instances it may be found that a small quantity of ground sulphur in the bath will materially assist this step of the process.

When the rubber to be treated is comparatively fresh and has only a thin crust of hardened or glazed surface, the preliminary softening bath may be dispensed with, and the surface simply rubbed with sand paper, or otherwise scraped or ground in any preferred manner.

When the rubber is treated by any of the above described methods, its surface will be found to be quite porous.

The following step in the process is intended to render the surface more porous by the removal of the excess sulphur, and also to neutralize the set or tension of the molecules of the rubber that is set up during vulcanization.

Before going into further detail relative to this step of the process, it may be well to state that when introducing sulphur into the rubber when the original mixture is made, only a part of the sulphur is thoroughly mixed with the rubber, the percentage of sulphur that is not taken up by the rubber, increasing as the volume of sulphur is increased, as compared to the volume of the mass.

This surplus or excess sulphur lodges in or forms pockets in the rubber during the mixing process and remains, not only in a useless, but damaging condition throughout the rubber, and it is the removal of said excess sulphur, not only to remove its damaging effect on the rubber, but to make use of the cavities or interstices formerly occupied by said excess sulphur, that the next step in this process is provided, as well as for other reasons that will be explained later.

The rubber is immersed in a bath, preferably of water, at a temperature of approximately 100 deg. F. and is subjected to a twisting and working action, as well as to a vigorous rubbing or scrubbing, which works the excess sulphur out of the rubber and leaves the pockets formerly occupied by said excess sulphur, vacant, and the mass more porous than before. This step in the process is preferably repeated three or four times.

The application of the hot bath and working and scrubbing not only relieves the rubber of the excess sulphur but two other very important results are accomplished by the application of heat.

One of said results accomplished in conjunction with the release and removal of the excess sulphur by the application of heat, is a separate step in this process and consists in the enlargement of the cavities formerly occupied by the excess sulphur.

The enlargement of the sulphur cells is accomplished through the application of heat which expands both the sulphur and the rubber, the compression being all taken up and to a certain degree, made permanent in the rubber. When the mass is cooled the sulphur contracts as well as the rubber and the result is an enlarged cavity when the mass is at normal temperature. It being understood that a temperature only slightly above the temperature here used, is necessary in shaping and vulcanizing rubber. From the enlarged cavities the sulphur is easily and thoroughly brushed.

The other very important benefit as a result of the application of heat in combination with the working and scrubbing which releases and removes the sulphur, being to relieve the strained condition of the molecules of the rubber, and permit their return to a relaxed condition or state of rest, thereby providing greatly increased elasticity.

In treating crude rubber, there is no excess sulphur and the portion of this process for removing same may be dispensed with, but the application alternately of hot and cold baths, or hot baths and any cooling means, with rubbing or scrubbing, will act on the molecules of the rubber to relieve their strained condition set up in the curing of the rubber and the removal of some of the resin, thereby increasing its elasticity and rendering the mass porous.

While slight modifications of the process are best adapted to certain conditions, the fundamental principles involved throughout are:

The release of the excess sulphur, rendering porous, and relieving the strained condition of the molecules of the rubber.

The removal of the excess sulphur disposes of a useless and damaging element.

The porousness of the rubber admits moisture and prevents drying.

Relieving the strain or tension on the rubber molecules, increases elasticity and reduces wear.

Thereby providing a soft and pliable rubber that will, if properly treated, in its original manufacture and by this process, retain said qualities almost indefinitely.

Having thus described my invention, what I claim and desire to secure by Letters Patent is:

1. The herein described process for preserving the elasticity of commercial rubber articles, which consists in rendering the same porous by removing the outer surface, then heating, then twisting and working, and finally rubbing and scrubbing.

2. The herein described process for preserving the elasticity of rubber articles, which consists in removing the excess sulphur, immersing alternately in hot, then cold water, rubbing, stretching and drying.

3. The herein described process for preserving the elasticity of rubber articles which consists in immersing in hot water to soften and remove the outer glazed surface, immersing alternately in hot and cold water to compress the rubber and increase the size of the cavities occupied by the excess sulphur and release the sulphur therein, twisting and working to release the sulphur and permit the molecules of the rubber to reach a state of rest, and rubbing and scrubbing to remove the sulphur and provide a porous mass, into which moisture may penetrate to prevent drying.

4. The herein described process for preserving the elasticity of rubber articles, which consists in immersing in a hot bath containing a small quantity of sulphur, removing the outer surface, immersing in a hot bath, working and twisting, and then drying.

RUBEN ZERTUCHE.